(12) United States Patent
Price

(10) Patent No.: US 12,151,192 B2
(45) Date of Patent: Nov. 26, 2024

(54) PACKED TOWER

(71) Applicant: Edwards Limited, Burgess Hill (GB)

(72) Inventor: Duncan M. Price, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 394 days.

(21) Appl. No.: 17/760,622

(22) PCT Filed: Sep. 23, 2020

(86) PCT No.: PCT/GB2020/052295
§ 371 (c)(1),
(2) Date: Mar. 15, 2022

(87) PCT Pub. No.: WO2021/058946
PCT Pub. Date: Apr. 1, 2021

(65) Prior Publication Data
US 2022/0274044 A1 Sep. 1, 2022

(30) Foreign Application Priority Data
Sep. 26, 2019 (GB) ...................................... 1913914

(51) Int. Cl.
*B01D 53/22* (2006.01)
*B01D 47/06* (2006.01)
*B01D 47/14* (2006.01)

(52) U.S. Cl.
CPC ............. *B01D 47/14* (2013.01); *B01D 47/06* (2013.01)

(58) Field of Classification Search
CPC ................................ B01D 47/06; B01D 47/14
See application file for complete search history.

(56) References Cited

U.S. PATENT DOCUMENTS 1,788,306 A * 1/1931 Kline ..................... B01D 47/14
96/299
3,132,629 A * 5/1964 Krupotich ................ B43M 7/02
83/912

(Continued)

FOREIGN PATENT DOCUMENTS

| CN | 1418128 A | 5/2003 |
| CN | 101489650 A | 7/2009 |

(Continued)

OTHER PUBLICATIONS

Machine translation of CN104056511 (Year: 2014).*

(Continued)

*Primary Examiner* — Anthony R Shumate
(74) *Attorney, Agent, or Firm* — Theodore M. Magee; Westman, Champlin & Koehler, P.A.

(57) ABSTRACT

A packed tower includes a packed tower housing having an inlet for receiving an effluent stream; an outlet for venting the effluent stream; a packed substrate housed within the packed tower housing between the inlet and the outlet, the packed substrate being configured to entrain at least some of particles from a fluid as the effluent stream flows therethrough; and a fan housed within the packed tower housing, the fan being configured to propel the effluent stream from the inlet towards the outlet and to remove at least some of the particles from the fluid. The fan helps to generate a negative pressure to draw the effluent stream into the packed tower and through the packed substrate, which reduces the back pressure improves the flow of effluent stream through the packed tower and upstream abatement apparatus and helps to improve the removal of particles from within the effluent stream.

9 Claims, 2 Drawing Sheets

(56) References Cited

U.S. PATENT DOCUMENTS

| | | | | |
|---|---|---|---|---|
| 3,155,472 | A | * | 11/1964 | Huppke ............... B01D 47/021 261/DIG. 26 |
| 5,902,337 | A | | 5/1999 | Di Lelio et al. |
| 6,158,412 | A | | 12/2000 | Kim |
| 6,638,343 | B1 | | 10/2003 | Kawamura et al. |
| 9,795,913 | B1 | | 10/2017 | Flora et al. |
| 10,040,026 | B2 | | 8/2018 | Furuta et al. |
| 2003/0047820 | A1 | | 3/2003 | Lehman et al. |
| 2006/0193748 | A1 | * | 8/2006 | Tai ..................... G01N 30/7266 250/281 |
| 2008/0169576 | A1 | * | 7/2008 | Kojima ................. B01D 45/12 261/126 |
| 2013/0032032 | A1 | * | 2/2013 | Chang ................... B01D 47/14 96/291 |
| 2017/0144092 | A1 | * | 5/2017 | Seeley ..................... B04B 5/10 |
| 2021/0101131 | A1 | * | 4/2021 | Ishii ..................... B01D 15/206 |
| 2021/0387179 | A1 | * | 12/2021 | Shih ....................... G01N 30/56 |
| 2022/0220292 | A1 | * | 7/2022 | Karjala ................ C08F 210/16 |
| 2023/0191310 | A1 | * | 6/2023 | Park .................. B01D 46/0036 422/171 |

FOREIGN PATENT DOCUMENTS

| | | | |
|---|---|---|---|
| CN | 104056511 | A | 9/2014 |
| CN | 203853002 | U | 10/2014 |
| CN | 105050687 | A | 11/2015 |
| CN | 106659958 | A | 5/2017 |
| CN | 107073486 | A | 8/2017 |
| CN | 207085590 | U | 3/2018 |
| FR | 3066253 | A1 | 11/2018 |
| GB | 2528444 | A | 1/2016 |
| GB | 2528445 | A | 1/2016 |
| KR | 100966737 | B1 | 6/2010 |
| TW | 349876 | B | 1/1999 |
| TW | 393341 | B | 6/2000 |
| TW | 495375 | B | 7/2002 |
| WO | 2004067926 | A1 | 8/2004 |
| WO | 2018142008 | A2 | 8/2018 |
| WO | 2019034877 | A1 | 2/2019 |

OTHER PUBLICATIONS

Machine translation of CN101489650 (Year: 2009).*
Chinese Office Action dated Apr. 1, 2024 and Search Report dated Mar. 23, 2024 for corresponding Chinese application Serial No. 202080067280.0, 6 pages.
Chinese First Office Action dated Jan. 2, 2023 and Search Report dated Dec. 29, 2022 for corresponding Chinese application Serial No. 202080067280.0, 15 pages.
Eichenberg et al., Development of a 32 Inch Diameter Levitated Ducted Fan Conceptual Design, NASA/TM-2006-214481, 40 pages, 2006.
Hurtado et al., Quiet Rim Driven Ventilation Fan Design, Abstract only, The Journal of the Acoustical Society of America, 1 page, 2017.
RotoClone W, Wet Dust Collector, Leading the Way in Wet Dust Collection Technology, AAF International, 2016, 12 pages.
Wikipedia, Rim-Driven Thruster, retrieved, Mar. 21, 2023, 1 page.
British Examination Report dated Feb. 20, 2020 and Search Report dated Feb. 19, 2020 for corresponding British Application No. GB1913914.6, 5 pages.
PCT Notification of Transmittal of the International Search Report and the Written Opinion of the International Searching Authority, or the Declaration dated Dec. 18, 2020 and PCT International Search Report dated Dec. 18, 2020 for corresponding PCT application Serial No. PCT/GB2020/052295, 6 pages.
PCT Written Opinion of the International Searching Authority, or the Declaration dated Dec. 18, 2020 for corresponding PCT application Serial No. PCT/GB2020/052295, 10 pages.
Japanese Notification of Reason for Rejected dated Jun. 13, 2024 for corresponding Japanese application Serial No. 2022-518717, 5 pages.
Taiwanese Office Action dated Sep. 2, 2024 for corresponding Taiwanese application Serial No. 109133483, 15 pages.

* cited by examiner

PACKED TOWER

CROSS-REFERENCE OF RELATED APPLICATION

This application is a Section 371 National Stage Application of International Application No. PCT/GB2020/052295, filed Sep. 23, 2020, and published as WO 2021/058946 A1 on Apr. 1, 2021, the content of which is hereby incorporated by reference in its entirety and which claims priority of British Application No. 1913914.6, filed Sep. 26, 2019.

FIELD

The field of the invention relates to a packed tower.

BACKGROUND

Abatement treatment apparatus are known. Such apparatus are used for treatment of an effluent gas stream from a manufacturing process tool used in, for example, the semiconductor or flat panel display manufacturing industry. During such manufacturing, thermal abatement chambers often produce solid particles and gaseous by-products resulting from the process occurring within the chamber. For example, when silane burns, large amounts of silica (SiO2) particles are generated. Also, when tungsten hexafluoride (WF6) is abated large amounts of solid tungsten oxide particles are produced in addition to gaseous hydrogen fluoride (HF).

Before the effluent gas stream is vented into the atmosphere, it is treated to remove selected gases and solid particles therefrom. Acid gases such as HF and HCl are commonly removed from the effluent gas stream using a packed tower scrubber, in which the acid gases are taken into solution by a scrubbing liquid flowing through the scrubber. In addition particles may be taken into suspension by the scrubbing liquid within the packed tower scrubber.

Although such packed towers provide for treatment of the effluent gas stream, they have a number of shortcomings. Accordingly, it is desired to provide an improved packed tower.

It is also know from GB2528444B2 to provide a radial fan elevationally below a packed tower to remove particles from an effluent gas stream prior to them entering the packed tower.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a packed tower for treating an effluent stream comprising a fluid and particles from an abatement apparatus, the packed tower comprising: a packed tower housing having an inlet for receiving the effluent stream; an outlet for venting the effluent stream; a packed substrate housed within the packed tower housing between the inlet and the outlet, the packed substrate being configured to entrain at least some of the particles from the fluid as the effluent stream flows therethrough; and a fan housed within the packed tower housing, the fan being configured to propel the effluent stream from the inlet towards the outlet and to remove at least some of the particles from the fluid.

The first aspect recognizes that a problem with existing packed towers is that their performance is sub-optimal. Accordingly, a packed tower is provided. The packed tower may treat or process an effluent stream. The effluent stream may comprise a fluid, for example a gas, together with particles or solid particulate matter. The effluent stream may be provided by an abatement apparatus. The packed tower may comprise a packed tower housing or chamber. The housing may have an inlet which receives the effluent stream. The housing may have an outlet which vents, provides or outputs the effluent stream. The housing may comprise a packed substrate. The packed substrate may be located between the inlet and the outlet. The packed substrate may entrain or capture particles within the effluent stream as the effluent stream flows through the packed substrate. The housing may comprise a fan located within the housing. The fan may propel, convey or urge the effluent stream between the inlet and the outlet, through the packed substrate and remove or separate at least some of the particles from the fluid of the effluent stream. In this way, the fan helps to generate a negative pressure to draw the effluent stream into the packed tower and through the packed substrate, which reduces the back pressure experienced by, for example, a semiconductor processing tool providing the effluent stream, improves the flow of effluent stream through the packed tower and upstream abatement apparatus and helps to improve the removal of particles from within the effluent stream.

In one embodiment, the fan comprises a combined mass-flow and centrifugal separator fan.

In one embodiment, the fan is configured to generate a motive force to induce a flow of the effluent stream from the inlet to the outlet.

In one embodiment, the fan is configured to generate a pressure difference between the inlet and the outlet to induce a flow of the effluent stream from the inlet to the outlet.

In one embodiment, the fan comprises an axial centrifugal fan having a centrifugal impeller.

In one embodiment, the centrifugal impeller is configured to remove at least some of the particles from the fluid. Accordingly, the centrifugal impeller may help to remove or separate some of the particles from the fluid of the effluent stream.

In one embodiment, the centrifugal impeller is axially-aligned with a major direction of flow of the effluent stream from the inlet to the outlet. Accordingly, in a generally-cylindrical packed tower, the impeller may rotate circumferentially within the packed tower.

In one embodiment, the centrifugal impeller is configured to propel the effluent stream along the major direction of flow of the effluent stream from the inlet to the outlet and to propel the particles in a director transverse to the major direction of flow. Accordingly, for a generally-cylindrical packed tower, the impeller may convey the effluent stream along the major cylindrical axis of the packed tower and convey the particles in a generally radial direction towards the cylindrical walls.

In one embodiment, the fan defines at least one axial opening configured to convey the effluent stream towards the outlet. Accordingly, the fan may be provided with one or more openings to provide a fluid path from the inlet to the outlet.

In one embodiment, the fan comprises an annular ring defining the at least one axial opening.

In one embodiment, the fan is mechanically and/or electromagnetically and/or fluidly driven.

In one embodiment, the fan comprises circumferentially-positioned magnets arranged thereon and the packed tower comprises corresponding circumferentially-positioned driver coils located on the packed tower housing. Accordingly, the fan may be driven as a motor with the stator components being provided by coils on the packed tower and the rotor components being provided by magnets on the fan.

In one embodiment, the circumferentially-positioned driver coils are located on an external surface of the packed tower housing.

In one embodiment, the fan comprises at least one aperture configured to convey a tower fluid, a force generated from conveying the tower fluid from the at least one aperture causing the fan to rotate. Hence, fluid being ejected by the fan itself may be used to rotate the fan.

In one embodiment, the packed tower comprises at least one aperture configured to convey a tower fluid towards the fan, a force generated from receiving the tower fluid by the fan causing the fan to rotate. Hence, fluid being directed onto the fan may be used to rotate the fan.

In one embodiment, the packed tower housing comprises a shaft coupled with the fan and configured to cause the fan to rotate. Hence, a mechanical coupling may be made from a motor to rotate the fan.

In one embodiment, the packed tower housing comprises a converging structure configured to concentrate flow of the effluent stream towards the fan. Accordingly, the converging or conical structure may direct and increase the flow rate of the effluent stream towards the fan.

In one embodiment, the packed tower housing comprises a fluid-trap structure configured to resist flow of the effluent stream towards the inlet. The fluid-trap structure provides a back-pressure which resists the flow of the effluent stream and instead encourages flow towards the outlet. The fluid-trap may be formed on an outer surface of the conical structure.

In one embodiment, the converging structure comprises a conical structure configured to concentrate flow of the effluent stream towards a centre of the fan.

In one embodiment, the converging structure is positioned upstream of the fan and downstream of the inlet.

In one embodiment, the packed tower housing comprises at least one cyclone separator configured to receive the effluent stream from the fan.

In one embodiment, the at least one cyclone separator is positioned downstream of the fan and upstream of the outlet.

In one embodiment, the packed tower housing comprises at least one spray nozzle configured to spray the fan with the tower fluid.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing embodiments, first an overview will be provided. Embodiments provide a packed tower apparatus which has a fan which encourages a flow of the incoming effluent stream and which helps remove particles from the effluent stream. This helps to alleviate any backpressure which would otherwise restrict the flow of the effluent stream, as well as improving the particle removal performance of the packed tower. Typically, the fan is a combined mass-flow and centrifugal separator fan such as, for example, an axial centrifugal fan. The fan may be positioned at a variety of different locations within the packed tower, and more than one fan may be provided, as required. The operation of the fan may be effected in a variety of different ways, such as using an electrical drive, a mechanical drive and/or by being driven by fluid within the packed tower.

Packed Tower

Figure 1:
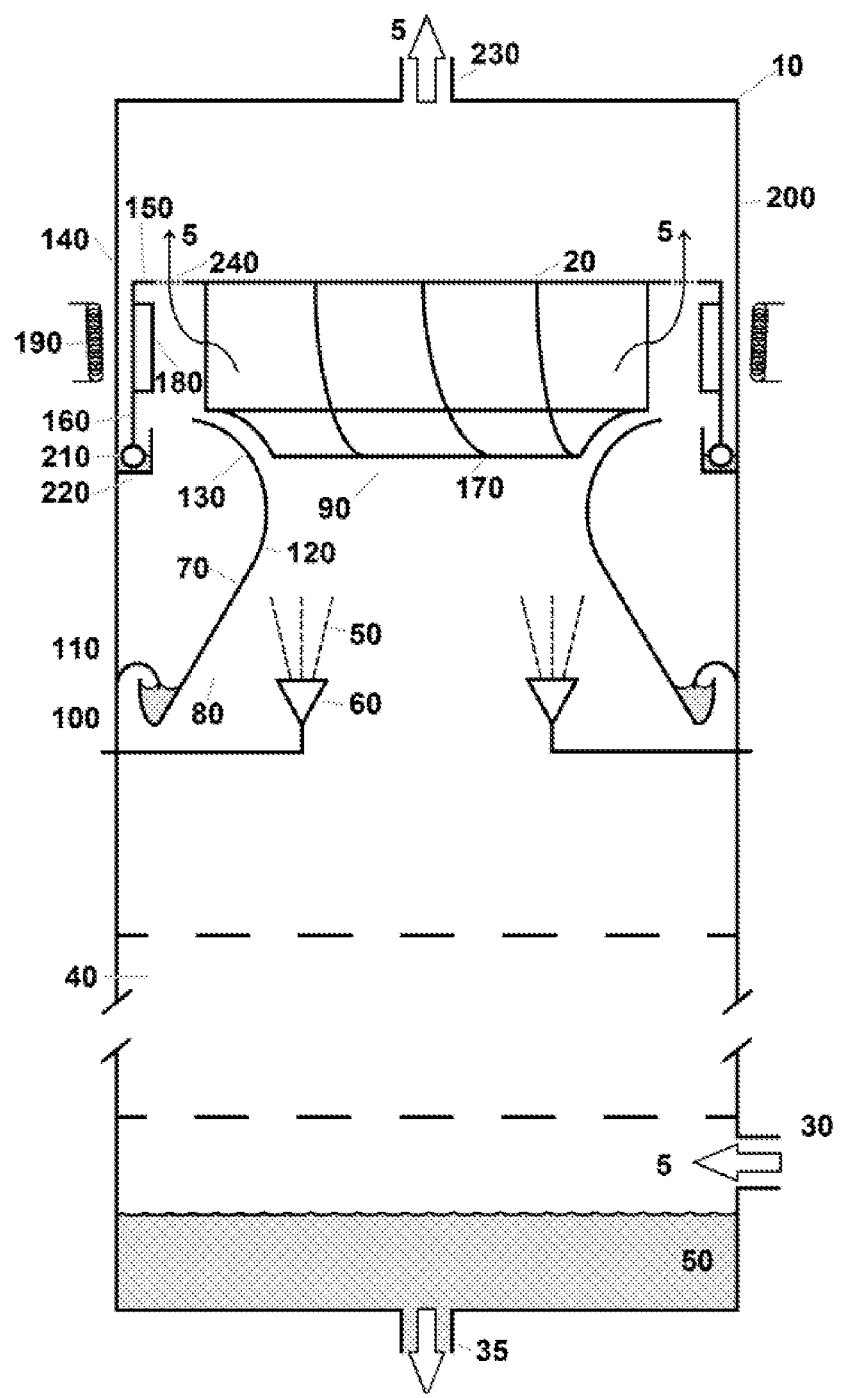
FIG. 1 is a schematic view of a portion of a packed tower incorporating a fan according to one embodiment.
Figure 2:
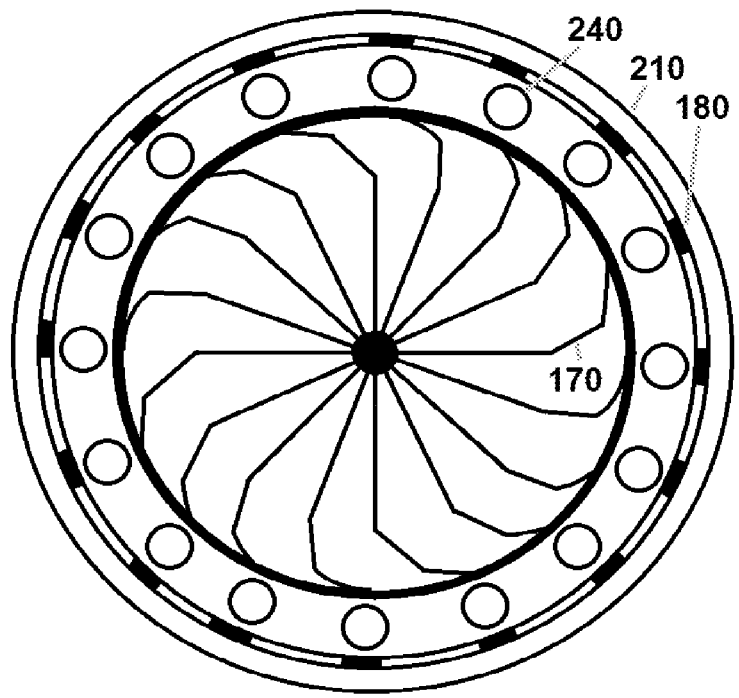
FIG. 2 is a schematic view of an underside of the fan.
Figure 3:
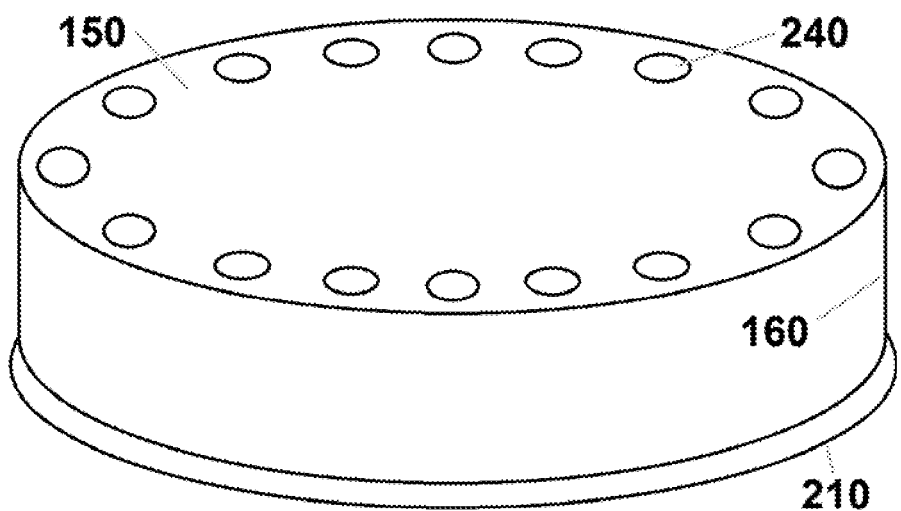
FIG. 3 is a schematic perspective view of the fan.

FIG. 1 is a schematic view of a portion of a packed tower, generally 10, incorporating a fan 20, according to one embodiment. FIG. 2 is a schematic view of an underside of the fan 20. FIG. 3 is a schematic perspective view of the fan 20.

The packed tower 10 will typically form a later stage of an abatement apparatus. The packed tower 10 has an inlet 30 which receives an effluent stream 5 from an upstream stage of the abatement apparatus, such as, for example, an abatement chamber weir. The effluent stream 5 flows upwardly, against gravity, through packed media 40. A packed tower fluid 50, such as water, flows downwardly, with gravity, through the packed media 40 contra to the effluent stream flow. This helps to entrain particles within the effluent stream 5 and dissolve any water soluble gases. A packed tower fluid outlet 35 is provided to allow the packed tower fluid 50 to be removed from the packed tower 10. Positioned downstream of the packed media 40 and typically positioned elevationally above the packed media 40 are nozzles 60 which deliver the packed tower fluid 50. Further nozzles may be provided elsewhere, such as downstream of the fan 20, if required. The packed tower fluid 50 is either sent to drain (a once-through design) or (partially) recirculated—both have their advantages—the once-through approach uses fresh water which can dissolve the greater amount water soluble gas whereas a recirculated system is more economical in terms of water usage but has lower scrubbing ability (dependent on the degree of recirculation) as the water already contains dissolved gas.

Also positioned downstream of the packed media 40 and typically elevationally above the nozzles 60 is a conical structure 70. The conical structure 70 has a larger cross-sectional area opening 80 positioned proximate the inlet 30 and narrows to a smaller cross-sectional area opening 90 downstream of the opening 80 and distal from the inlet 30. The opening 80 has a radially-extending lip portion which curves outwardly and extends back in the direction towards the narrower opening 90 to form a trough 100. A co-operating rim structure 110 is positioned to extend into a void defined between the trough 100 and a planar surface 120 of the conical structure 70. The trough 100 together with the rim structure 110 form a water trap, as will be described in more detail below. The opening 90 has a curved portion 130 which follows an arc extending radially outwards towards the walls of the packed tower housing 200.

The fan 20 is positioned downstream of the conical structure 70, proximate the opening 90. The fan 20 has a housing 140 which has a circular end plate 150 and a cylindrical wall 160. The end plate 150 carries fan vanes 170 and the cylindrical wall 160. As can best be seen in FIGS. 2 and 3, vents 240 are formed in the end plate 150. In this example, the vents 240 are circular and positioned circumferentially around the end plate. However, it will be appreciated that the vents 240 may have any suitable shape and location to permit fluid communication through the fan 20. As can be seen, the shape of the fan vanes 170 and the curved portion 130 are matched. The fan vanes 170 and the curved portion 130 are positioned to provide a running clearance between the fan vanes 170 and the curved portion 130. The fan vanes 170 are shaped in the manner of an axial centrifugal fan. The cylindrical wall 160 carries magnets 180. Corresponding coils 190 are positioned around the circumference of the packed tower housing 200. Positioned along a circumferential edge of an open end of the cylindrical wall 160 is a flotation ring 210. An annular trough 220 extends radially inwards from an inner surface of the packed tower housing 200, within which the flotation ring 210 is received. Positioned downstream of the fan 20 is an outlet 230.

In operation, the nozzles 60 spray packed tower fluid 50 in the vicinity of the conical structure 70. The coils 190 are energized, which causes the fan 20 to rotate. The presence of packed tower fluid 50 in the trough 220 provides a fluid bearing as the flotation ring 210 floats. The rotation of the fan 20 causes a mass flow of fluid within the packed tower housing 200. The geometry of the conical structure 70, the presence of the curved portion 130, the presence of the vents 240, together with the backpressure caused by the presence of packed tower fluid 50 in the trough 100 (which acts a fluid trap) causes the effluent stream 5 within the packed tower housing 200 to be conveyed generally from the inlet 30, through the vents 240 to the outlet 230. This mass flow helps to create a reduced pressure which helps draw the effluent stream 5 through earlier stages of the abatement apparatus and through the packed media 40, reducing the backpressure experienced by an upstream semiconductor processing tool.

The presence of the packed tower fluid 50 helps to entrain particles within the effluent stream 5 and dissolve soluble compounds. The packed tower fluid 50 also helps to keep the structures within the packed tower housing 200 clean, as well as providing for a fluid bearing for the fan 20 and a fluid trap in the trough 100 to provide a backpressure to urge the effluent stream through the vents 240. The operation of the fan vanes 170 helps to separate the packed-tower fluid 50 and any particulate matter from the effluent stream 5. The separated material is propelled generally towards the packed tower housing 200 and is generally contained by the cylindrical wall 160 and end plate 150 where it falls under gravity in the void between the conical structure 70 and packed tower housing 200, into the trough 100 which overflows back onto the packed media 40.

An embodiment provides an arrangement where a centrifugal impeller is mounted vertically in the upper part of a water-washed packed tower driven at its periphery by a magnetic coupling acting through the walls of the packed tower. The impeller is located on a hydrodynamic bearing at the exit to a conical inlet which directs the process flow into the centre of the impeller, and accelerated radially to impinge on the walls of the packed tower. Atomising sprays add water droplets to the incoming process flow in order to entrain powder particles and also wash the impeller/inlet assembly. The water and process flow are then separated by cyclonic action such that the water (and entrained particulate matter) is washed down into the packed tower, and the gas escapes out of the top of the packed tower, thus affording the benefits of increased draw through the system and water & particulate removal. This arrangement provides additional gas draw through abatement systems by mechanical means rather than using an air amplifier. Instead a rotary fan is fitted in the exhaust of packed tower, mounted vertically inside the pipe. Locating the fan inside the packed tower enables a misting spray to be used to rinse the fan. Using a centrifugal impeller allows the water/particulate to be expelled towards the wall of the packed tower.

An embodiment provides a centrifugal compressor rotor contained within the walls of a cylindrical tube and mounted on a hydrodynamic bearing surface. A magnetic coupling provides a means of rotating the compressor without needing to provide a gas tight seal in the walls of for a drive shaft or drive belt. A conical inlet structure directs the incoming gas stream into the centre of the centrifugal compressor rotor whereby it is accelerated outwards towards and gas escapes through openings in the support for the rotor and liquid thereby entrained is separated and falls down the gap between the inlet structure and the walls of the tube. Additional water misting sprays are provided to aid cleaning of the rotor and entrain suspended particulate in the gas stream. The blades are provided on the lower face and openings allow gas to flow through the rotor near its periphery. This provides an arrangement with a vertically mounted centrifugal impellor with provision for water to be reclaimed and recirculated (other embodiments have once through operation and horizontal impellors). The rim drive and bearing mechanism means that the rotor can be sealed within the packed tower.

An air cyclone, or multiple air cyclones, may be fitted above the centrifugal rotor, to remove water mist droplets from the exhaust and prevent excessive water carryover to the exhaust.

In another variation, the centrifugal compressor rotor is mounted on a driven rotating central shaft, instead of being driven by rim drive. The shaft is driven by a motor mounted on the top of the scrubbing tube, using either a direct shaft passing through a rotating seal in the packed tower lid, or through a magnetic shaft coupling in the scrubbing tube lid. The magnetic coupling is advantageous in that the rotor can be sealed within the packed tower. The shaft may also have a magnetic or mechanical bearing mounted in the centre of an air cyclone assembly, to provide support for the shaft. This configuration reduces the diameter of the system as it does not require a rim drive around the tube, but increases the height of the assembly by the height of the motor. The exhaust port is then offset from the centre of the tube as the drive motor is in the centre.

In another variation, the tower fluid is used to drive the fan. This is achieved by directing the fluid onto the fan to cause it to rotate and/or by having apertures on the fan from which the fluid is ejected.

A further variation would be to place the drive motor below the scrubbing tube. However this is not preferred, as the drive shaft, feedthrough, and bearings would be passing through the unscrubbed exhaust stream, and therefore exposed to more powder and acid, which may shorten the life of the parts.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A packed tower for treating an effluent stream comprising a fluid and particles from an abatement apparatus, said packed tower comprising:
    a packed tower housing having
        an inlet for receiving said effluent stream;
        an outlet for venting said effluent stream;
    a packed substrate housed within said packed tower housing between said inlet and said outlet, said packed substrate being configured to entrain at least some of said particles from said fluid as said effluent stream flows therethrough; and
    a fan housed within said packed tower housing, said fan being configured to propel said effluent stream from said inlet towards said outlet and to remove at least some of said particles from said fluid, said fan comprising an axial centrifugal fan having a centrifugal impeller and at least one aperture configured to convey a tower fluid, wherein a force generated from conveying said tower fluid from said at least one aperture causing said fan to rotate and wherein the centrifugal fan further comprises an annular fluid bearing.

2. The packed tower of claim 1, wherein said centrifugal impeller is axially-aligned with a major direction of flow of said effluent stream from said inlet to said outlet.

3. The packed tower of claim 1, wherein said centrifugal impeller is configured to propel said effluent stream along said major direction of flow of said effluent stream from said inlet to said outlet and to propel said particles in a direction transverse to said major direction of flow.

4. The packed tower of claim 1, wherein said fan defines at least one axial opening configured to convey said effluent stream towards said outlet.

5. The packed tower of claim 1, wherein said packed tower housing comprises a converging structure configured to concentrate flow of said effluent stream towards said fan.

6. The packed tower of claim 5, wherein said converging structure is positioned upstream of said fan and downstream of said inlet.

7. The packed tower of claim 1, wherein said packed tower housing comprises a fluid-trap structure configured to resist flow of said effluent stream towards said inlet.

8. The packed tower of claim 1, wherein said packed tower housing comprises at least one cyclone separator configured to receive said effluent stream from said fan.

9. The packed tower of claim 1, wherein said packed tower housing comprises at least one spray nozzle configured to spray said fan with said tower fluid.

* * * * *